US007925510B2

(12) United States Patent
Creamer et al.

(10) Patent No.: US 7,925,510 B2
(45) Date of Patent: Apr. 12, 2011

(54) COMPONENTIZED VOICE SERVER WITH SELECTABLE INTERNAL AND EXTERNAL SPEECH DETECTORS

(75) Inventors: Thomas E. Creamer, Boca Raton, FL (US); Victor S. Moore, Boynton Beach, FL (US); Wendi L. Nusbickel, Boca Raton, FL (US); Ricardo Dos Santos, Boca Raton, FL (US); James J. Sliwa, Raleigh, NC (US)

(73) Assignee: Nuance Communications, Inc., Burlington, MA (US)

( * ) Notice: Subject to any disclaimer, the term of this patent is extended or adjusted under 35 U.S.C. 154(b) by 1130 days.

(21) Appl. No.: 10/833,615

(22) Filed: Apr. 28, 2004

(65) Prior Publication Data

US 2005/0246166 A1 Nov. 3, 2005

(51) Int. Cl.

| | |
|---|---|
| ***G10L 21/00*** | (2006.01) |
| ***G10L 15/00*** | (2006.01) |
| ***G10L 15/20*** | (2006.01) |
| ***G10L 17/00*** | (2006.01) |
| ***G10L 15/04*** | (2006.01) |
| ***H04M 1/64*** | (2006.01) |

(52) U.S. Cl. ..................... 704/270.1; 704/231; 704/233; 704/246; 704/251; 704/275; 704/270; 379/88.04

(58) Field of Classification Search .................. 704/233, 704/270.1, 270, 275; 379/88.04
See application file for complete search history.

(56) References Cited

U.S. PATENT DOCUMENTS

| | | | | |
|---|---|---|---|---|
| 4,052,568 | A * | 10/1977 | Jankowski | 704/233 |
| 4,277,645 | A * | 7/1981 | May, Jr. | 704/233 |
| 4,357,491 | A * | 11/1982 | Daaboul et al. | 704/233 |
| 5,276,765 | A * | 1/1994 | Freeman et al. | 704/233 |
| 5,430,826 | A * | 7/1995 | Webster et al. | 704/200 |
| 5,533,118 | A * | 7/1996 | Cesaro et al. | 379/386 |

(Continued)

FOREIGN PATENT DOCUMENTS

WO WO0021075 * 4/2000

OTHER PUBLICATIONS

D. Pearce, "Developing the ETSI AURORA ad-vanced distributed speech recognition front-end &What next", Proc. EUROSPEECH2001, Sep. 2001.*

*Primary Examiner* — James S Wozniak
*Assistant Examiner* — Paras Shah
(74) *Attorney, Agent, or Firm* — Wolf, Greenfield & Sacks, P.C.

(57) ABSTRACT

A method for detecting speech utterances within a telephone call can include the steps of initializing a componentized voice server having at least one software-based speech detection routine. At least one previously established parameter can be used to discern a speech detection methodology for handling an incoming call. The software-based speech detection routine can be set in accordance with a select one of the parameters. An indicator of particular one of the parameters can be conveyed to an external speech detection component so that the external speech detection component is set to detect speech for the call in accordance with the conveyed indication. The software-based speech detection routine and/or the external speech detection component can detect a speech utterance for the call. The voice server can perform at least one programmatic action responsive to the detecting of the speech utterance.

20 Claims, 2 Drawing Sheets

U.S. PATENT DOCUMENTS

| | | | | |
|---|---|---|---|---|
| 5,870,705 | A | 2/1999 | McAuliffe et al. | |
| 5,983,186 | A * | 11/1999 | Miyazawa et al. | 704/275 |
| 6,041,301 | A | 3/2000 | Fado et al. | |
| 6,098,043 | A * | 8/2000 | Forest et al. | 704/270 |
| 6,122,384 | A * | 9/2000 | Mauro | 381/94.3 |
| 6,453,020 | B1 * | 9/2002 | Hughes et al. | 379/88.04 |
| 6,453,285 | B1 * | 9/2002 | Anderson et al. | 704/210 |
| 6,487,534 | B1 * | 11/2002 | Thelen et al. | 704/270 |
| 6,505,161 | B1 | 1/2003 | Brems | |
| 6,629,071 | B1 * | 9/2003 | Mann | 704/251 |
| 6,704,309 | B1 * | 3/2004 | Nada et al. | 370/389 |
| 6,751,296 | B1 * | 6/2004 | Albal et al. | 379/67.1 |
| 6,834,265 | B2 * | 12/2004 | Balasuriya | 704/231 |
| 6,985,865 | B1 * | 1/2006 | Packingham et al. | 704/275 |
| 7,171,357 | B2 * | 1/2007 | Boland | 704/231 |
| 7,203,643 | B2 * | 4/2007 | Garudadri | 704/233 |
| 7,206,387 | B2 * | 4/2007 | Jan et al. | 379/88.01 |
| 2002/0082834 | A1 | 6/2002 | Eaves et al. | |
| 2002/0123889 | A1 * | 9/2002 | Sienel et al. | 704/231 |
| 2002/0173957 | A1 | 11/2002 | Kawane et al. | |
| 2002/0194000 | A1 * | 12/2002 | Bennett et al. | 704/270 |
| 2004/0128135 | A1 * | 7/2004 | Anastasakos et al. | 704/270.1 |
| 2005/0240404 | A1 * | 10/2005 | Gurram et al. | 704/231 |
| 2006/0195323 | A1 * | 8/2006 | Monne et al. | 704/270.1 |

* cited by examiner

COMPONENTIZED VOICE SERVER WITH SELECTABLE INTERNAL AND EXTERNAL SPEECH DETECTORS

BACKGROUND

1. Field of the Invention

The present invention relates to the field of telecommunications and, more particularly, to speech utterance detection within a voice server.

2. Description of the Related Art

Telephone systems can utilize voice servers to add a multitude of speech services to telephone calls. Speech services can include automatic speech recognition (ASR) services, synthetic speech generation services, transcription services, language and idiom translation services, and the like. To perform these functions, voice servers must implement some form of speech detection to detect when a telephone caller is providing speech input upon which program actions are to be taken. The detection of speech input is typically followed by an allocation of an ASR engine to convert the detected utterances into a form that the voice server can interpret.

Conventional componentized voice servers, such as the Websphere Application Server (WAS) from International Business Machines Corporation (IBM) of Armonk, N.Y., utilize internal software-based speech detection routines. Speech detection operations can be entirely dependant upon these routines. For example, as currently implemented, the voice server component of the WAS, which is a Websphere Voice Server (WVS), performs all speech detection through internal software-based speech detection routines and does not permit WVS to detect speech utterances through external means.

The conventional approach for detecting speech utterances in a voice server possesses numerous shortcomings. One such shortcoming relates to inefficient use of scarce resources. That is, software-based speech detection routines can be very processor and memory intensive and can consume vast quantities of expensive computing resources. This is especially true, when the detection routines are set for high sensitivity levels and adjusted to optimize speech detection accuracy. These processor intensive routines, however, can exceed the detection needs of many customers. For example, a voice server customer may require only modest voice detection capabilities.

Further, many telephone gateways, hubs, and other telephony equipment possess integrated hardware-based speech detection capabilities. Unlike software-based detection techniques, hardware-based techniques need not consume extensive scarce resources. Instead, hardware-based techniques can monitor signal energy levels within telephony channels and differentiate speech utterances from silence and/or noise based upon differences in the signal energy levels. Many conventional voice servers fail to take advantage of these external hardware-based speech detection devices. It would be highly advantageous, if a voice server having internal software speech detection capabilities was able to selectively utilize externally available speech detection mechanisms in place of and/or in conjunction with internal software-based speech detection mechanisms.

SUMMARY OF THE INVENTION

The present invention includes a method, a system, and an apparatus for performing speech detection within a voice server in accordance with the inventive arrangements disclosed herein. More specifically, a pluggable, configurable speech detection component located remote from the voice server can be integrated with the internal, software-based speech detection routines of the voice server. The external speech detection component can be used in place of and/or in conjunction with these internal software-based speech detection routines. In one embodiment, the external speech detection component can be a hardware component disposed between a telephone gateway and the voice server.

In one embodiment, a voice server customer can configure the level of speech detection via a user interface. For example, the user interface can present the customer with a multiple choice list of options, each option representing a speech detection setting within the internal and/or external speech detecting component. Options can include hardware-detection only, software-detection only, and one or more options where both hardware and software detection occur.

One aspect of the present invention can include a method for detecting speech utterances within a telephone call. The method can include the step of initializing a componentized voice server having at least one software-based speech detection routine. A speech detection methodology for handling speech detection for an incoming call can be discerned. The methodology can include more than one selectable technique for performing speech detection, where a software-based technique using software-based speech detection routines internal to the voice server and/or an external technique executing in a computing space external to the componentized voice server can be included in these selectable techniques. A speech utterance can then be received and detected in accordance with said speech detection methodology. The voice server can perform at least one programmatic action responsive to the detecting of the speech utterance.

Another aspect of the present invention can include a method for detecting speech utterances within a telephone call. The method can include the step of initializing a componentized voice server having at least one software-based speech detection routine. At least one previously established parameter can be used to discern a speech detection methodology for handling an incoming call. The software-based speech detection routine can be set in accordance with a select one of the parameters. An indicator of a particular one of the parameters can be conveyed to an external speech detection component so that the external speech detection component is set to detect speech for the call in accordance with the conveyed indication. The software-based speech detection routine and/or the external speech detection component can detect a speech utterance for the call. The voice server can perform at least one programmatic action responsive to a detection of a speech utterance.

It should be noted that the invention can be implemented as a program for controlling a computer to implement the functions and/or methods described herein, or a program for enabling a computer to perform the process corresponding to the steps disclosed herein. This program may be provided by storing the program in a magnetic disk, an optical disk, a semiconductor memory, any other recording medium, or distributed via a network. Still another aspect of the present invention can include a telephony system providing speech services including an external speech detection component, a voice server, and an activation means. The external speech detection component can be operationally located remotely from the voice server. The external speech detection component can detect speech utterances by detecting energy differences within telephone channels. The voice server can include at least one internal software-based speech detection routine. The activation means can selectively activate the external speech detection component and/or the internal speech detection routine. When the voice server activates the external speech detection components, the voice server can perform speech detection using the external speech detection component. When the voice server activates the internal speech detection routine, the voice server can perform speech detection using the internal speech detection routine. The external speech detection component and the internal speech detection routines can be simultaneously activated and used conjunctively.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

Figure 1:
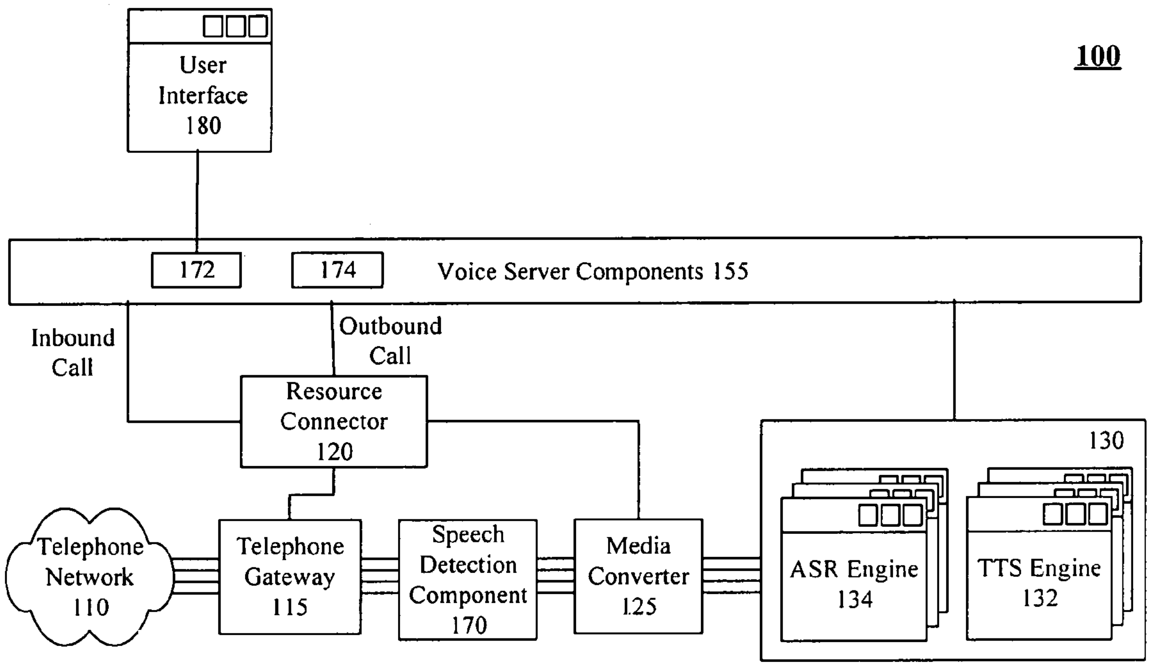
FIG. 1 is a schematic diagram illustrating a system including a componentized voice server with selectable internal and external speech detectors in accordance with the inventive arrangements disclosed herein.

FIG. 1 is a schematic diagram illustrating a system 100 including a componentized voice server with selectable internal and external speech detectors in accordance with the inventive arrangements disclosed herein. The system 100 can include a telephone gateway 115, a speech detection component 170, and a voice server that includes voice server components 155.

The telephone gateway 115 can include hardware and/or software that translates protocols and/or routes calls between a telephone network 110, such as a Public Switched Telephone Network (PSTN), and the voice server components 155. The telephone gateway 115 can route calls using packet-switched as well as circuit switched technologies. Further, the telephone gateway 115 can contain format converting components, data verification components, and the like. For example, the telephone gateway 115 can include a CISCO 2600 series router from Cisco Systems, Inc. of San Jose, Calif., a Cisco, a CISCO 5300 series gateway, a Digital Trunk eXtended Adapter (DTXA), an INTEL DIALOGIC Adaptor from Intel Corporation of Santa Clara, Calif., and the like.

The speech detection component 170 can selectively detect speech utterances for the voice server components 155. That is, the speech detection component 170 can be a pluggable component remotely located from the voice server components 155 that can be configured to interoperate with the voice server components 155.

In one arrangement, the speech detection component 170 can detect speech by detecting energy differences within a telephony channel associated with the call. The energy detection techniques used by the speech detection component 170 can be utilized in conjunction with other speech detection techniques to improve speech detection accuracy.

It should be noted that the speech detection component 170 is not limited to any particular detection methodology and that any methodology known in the art can be utilized. For example, the speech detection component 170 can utilize a methodology with a fixed threshold for speech detection, a technique with dynamically adapting speech thresholds, and the like. Content based detections methodologies, such as co-channel speech detection or out-of vocabulary (OOV) detection methodologies, can also be used by the speech detection component 170. Accordingly, the invention is not limited in regard to the speech detection methodologies that the speech detection component 170 utilizes.

In one embodiment, the speech detection component 170 can be a Voice Activation Detection (VAD) component embedded within the telephone gateway 115. In another embodiment, the speech detection component 170 can be contained within a stand-alone switch, router, or similar hardware device. For example, the speech detection component 170 can be disposed within a Cisco 2600 series modular router. The speech detection component 170 can also be realized within an adaptor card that can be inserted into interface slots, such as expansion slots of the telephone gateway 115, a telephony switch, a computer, and/or other such equipment. It should be appreciated that the speech detection component 170 is not limited in this regard, however, and that any speech-detecting component can be used. For example, the speech detection component 170 can be a software-based detector operating within a computing device.

The voice server can have a componentized and isolated architecture that can include voice server components 155 and a media converter component 125. In one embodiment, the voice server can include a Websphere Application Server (WAS). The voice server components 155 can include a telephone server, a dialogue server, a speech server, one or more web servers, and other such components. Selective ones of the voice server components 155 can be implemented as Virtual Machines, such as virtual machines adhering to the JAVA 2 Enterprise Edition (J2EE) specification. In one embodiment, a call descriptor object (CDO) can be used to convey call data between the voice server components 155. For example, the CDO can specify the gateway identifiers, audio socket identifiers, telephone identification data, and/or the like.

The voice server components 155 can also include a software-based speech detection module 174 and configurable speech detection parameters 172. The software-based speech detection module 174 can include one or more speech detection routines. For example, in one embodiment, the voice server components 155 can be a WVS and the software module 174 can include detection routines required as per the specifications of the WVS version 4.2 and below.

The speech detection parameters 172 can include multiple parameters that determine whether the detection routines within the software-based speech detection module 174 and/or the speech detection component 170 will be enabled for a given call. The speech detection parameters 172 can also specify threshold values, preferred detection algorithms, characterizations of speech utterances to be detected, and other parameters relevant to the speech detection component 170 and/or the speech detection module 174. Speech detection parameters 172 can be adjusted by customers, voice server administrators, or any authorized agent using a user interface 180.

The media converter 125 can perform media conversions between the telephone gateway 115 and speech engines 130, between the voice server components 155 and the telephone gateway 115, and between the voice server components 155 and the speech engine 130. In one embodiment, the media converter 125 can be a centralized interfacing subsystem of the voice server for inputting and outputting data to and from the voice server components 155. For example, the media converter 125 can include a telephone and media (T&M) subsystem, such as the T&M subsystem of a WAS.

The speech engines 130 can include one or more automatic speech recognition engines 134, one or more text to speech engines 132, and other speech related engines and/or services. Particular ones of the speech engines 130 can include one or more application program interfaces (APIs) for facilitating communications between the speech engine 130 and external components. For example, in one embodiment, the ASR engine 134 can include an IBM ASR engine with an API such as a Speech Manager API (SMAPI).

The system 100 can also include a resource connector 120. The resource connector 120 can be a communication intermediary between the telephone gateway 115 and the voice server components 155 and/or media converter 125. The resource connector 120 can manage resource allocations for calls.

In operation, a user can initiate a telephone call. The call can be conveyed through the telephone network 110 and can be received by the telephone gateway 115. The telephone gateway 115, having performed any appropriate data conversions, can convey call information to the resource connector 120. The resource connector 120 can trigger the initialization of the media converter 125 and/or the voice server components 155. Initialization of the voice server components 155 can include reading the speech detection parameters 172 and adjusting settings of the speech detection module 174 and adjusting settings of the speech detection component 170 settings accordingly. Speech utterances for the call can thereafter be detected by the speech detection component 170 and/or software routines within the speech detection module 174. Once speech utterances are detected, the voice server components 155 can responsively perform programmatic actions as appropriate.

It should be noted that the speech detection parameters 172 can be differentially established for different customers. In one embodiment, the customers can alter selective ones of the parameters 172 using the user interface 180.

Figure 2:
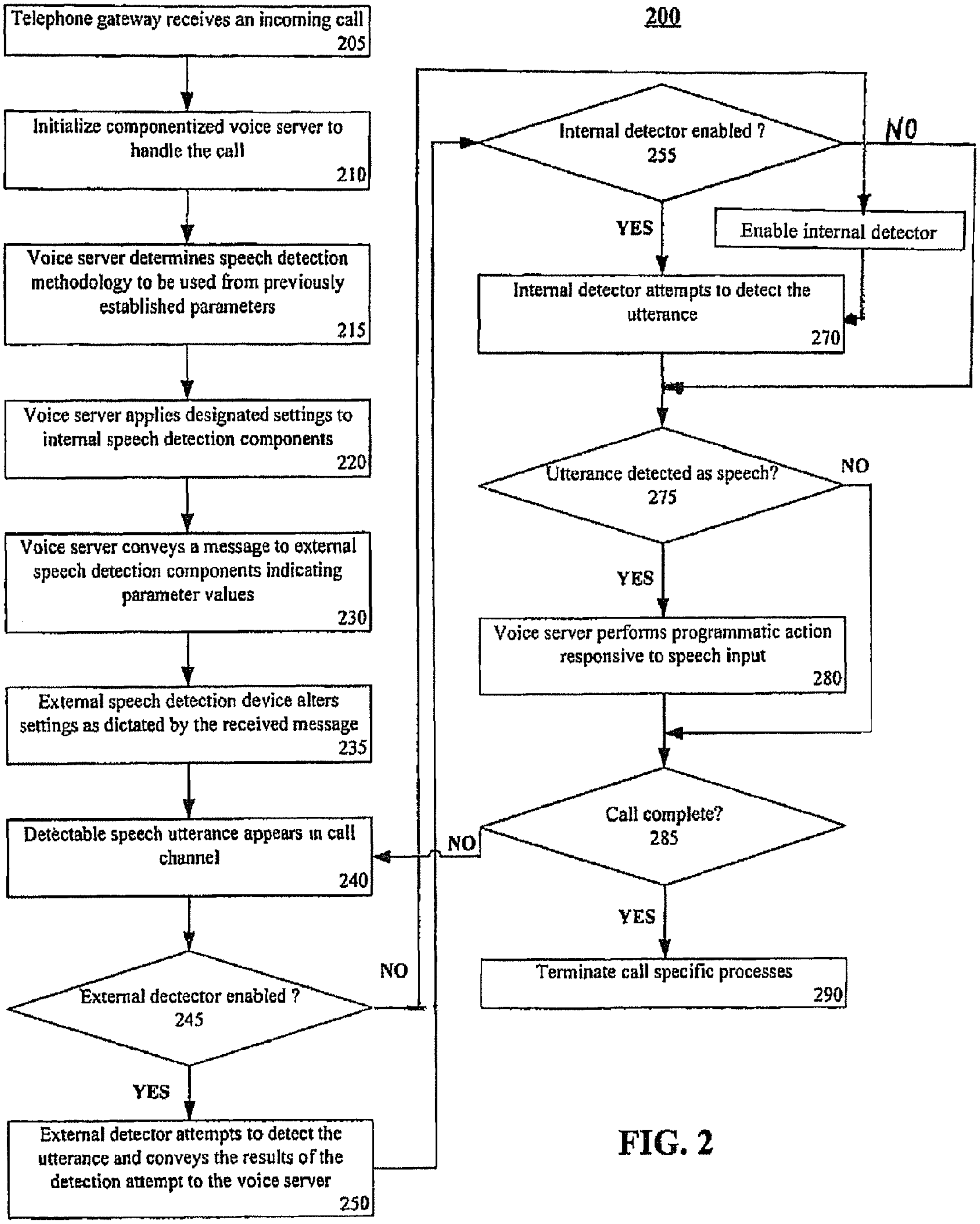
FIG. 2 is a flow chart of a configurable method for detecting speech within a telephone call in accordance with the inventive arrangements disclosed herein.

FIG. 2 is a flow chart of a method 200 for detecting speech within a telephone call in accordance with the inventive arrangements disclosed herein. The method 200 can be performed in the context of a voice server having a componentized and functionally isolated architecture. One of these components can be a T&M component that functions as a media converter. The T&M component can also centrally manage input and output for the voice server. The voice server can include at least one software-based speech detection routine. Further, a speech detection component can be operationally coupled between the T&M component and a telephone gateway.

The method can begin in step 205, where the telephone gateway can receive an incoming call. In step 210, a componentized voice server can be initialized to handle the call. In step 215, the voice server can determine a speech detection methodology to be used for the call by examining values of previously established parameters. In one embodiment, the parameters can be user-configurable parameters established by a customer utilizing services of the voice server. In step 220, the voice server can apply settings to internal speech detection components in accordance with the examined parameters. For example, if the parameters indicate that no internal speech detection is to be performed, the internal speech detection components can be disabled for purposes of the call.

In step 230, the voice server can convey a message to one or more external speech detection components indicating at least one of the parameter values. In step 235, the external speech detection device can alter its settings in accordance with the received message. For example, if the message indicates that the external speech detection component is to perform hardware-based speech utterance detections, the external speech detection device can take appropriate programmatic actions. It should be noted that the message can include any of a variety of settings, such as detection sensitivity parameters, that the external speech detection device can responsively apply.

In step 240, a detectable speech utterance can appear within the call channel. In step 245, a determination can be made as to whether the external speech detector is enabled. If an external speech detector is enabled, the method can proceed to step 250, where the external detector can attempt to detect the utterance. The external detector can convey results of the detection attempt to the voice server. The method can then proceed to step 255. Additionally, the method can proceed directly from step 245 to step 255 whenever the external detector is not enabled.

In step 255, a determination can be made as to whether a speech detector internal to the voice server is enabled. Such a speech detector can be a software-based detector. If internal detectors are enabled, the method can proceed to step 270, where the internal detector can attempt to detect the utterance. If internal detectors are not enabled, the method can proceed from step 255 to step 275. It should be noted that at least one of the speech detectors should be enabled for the voice server. That is, at least one of the external detector of step 245 and the internal detector of step 255 should be enabled. Further, it is possible to enable both an external speech detector and the internal speech detector simultaneously, thereby permitting the detectors to work conjunctively.

If a speech utterance is detected in step 275, the method can proceed to step 280, where the voice server can recognize the utterance and perform a programmatic action responsive to the utterance. Otherwise, the method can proceed to step 285. In step 285, if the call is not complete, the method can loop to step 240 where more detectable speech utterances can appear within the call channel. If the call is complete, the method can proceed to step 290, where call specific processes can be terminated.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for detecting speech utterances within a telephone call comprising the steps of:

receiving a signal representing a telephone call received over a telephone network by a telephone gateway;

initializing a componentized voice server having an internal speech detection module with a plurality of software-based speech detection routines and a Pluggable, configurable external speech detection component operationally located remotely from the voice server, wherein the external speech detection component is implemented as an electronic module plugged into a piece of equipment coupled in a signal path between the telephone network and the voice server;

presenting through a user interface options for speech detection settings and receiving through the user interface user selections indicating speech detection parameters, wherein the speech detection parameters determine whether the internal speech detection module, the external speech detection component or both the internal speech detection module and the external speech detection component will be activated;

when the received speech detection parameters indicate that the external speech detection component will be activated:

sending a message from the voice server to the external speech detection component to activate said external speech detection component;

processing the received signal to detect a speech utterance within the signal using the activated external speech detection component;

sending a message from the external speech detection component to the voice server conveying results of detecting a speech utterance; and performing with said voice server at least one programmatic action responsive to the detecting of the speech utterance, the programmatic action comprising recognizing speech in the detected speech utterance; and when the received speech detection parameters indicate that both the internal speech detection module and the external speech detection component will be activated:

sending a message from the voice server to the external speech detection component to activate said external speech detection component;

processing the received signal using the activated external speech detection component;

sending a message from the external speech detection component to the voice server conveying results of an attempt to detect a speech utterance; and performing with said voice server at least one programmatic action, the programmatic action comprising using the internal speech detection module conjunctively with the results of the attempt to detect the speech utterance in the external speech detection component to detect the speech utterance in the received signal; and when the received speech detection parameters indicate that the internal speech detection module will be activated:

processing the received signal to detect a speech utterance within the signal using the internal speech detection module; and performing with said voice server at least one programmatic action responsive to the detecting of the speech utterance.

2. The method of claim 1, wherein both of said internal speech detection module and said external speech detection component technique are utilized simultaneously.

3. The method of claim 1, wherein said external speech detection component is utilized and said internal speech detection module is not utilized.

4. The method of claim 1, wherein said external speech detection component performs hardware-based speech detection.

5. The method of claim 1, wherein said external speech detection component detects speech by detecting energy differences within a telephony channel.

6. The method of claim 1, further comprising the step of:

before said initializing step, receiving a user specified parameter; and storing said user specified parameter in a data store communicatively linked to said voice server.

7. The method of claim 1, wherein sending the message from the voice server to the external speech detection component comprises sending parameters relating to speech detection, the parameters comprising one or more of a threshold value, a preferred detection algorithm, and a characterization of speech utterances to be detected.

8. The method of claim 1, wherein:

the speech detection parameters further determine which detection routine within the internal speech detection module will be activated if the internal speech detection module is selected;

when the received speech detection parameters indicate that both the internal speech detection module and the external speech detection component will be activated, the method further comprises activating the detection routine within the internal speech detection module determined by the received speech detection parameters; and when the received speech detection parameters indicate that the internal speech detection module will be activated, the method further comprises activating the detection routine within the internal speech detection module determined by the received speech detection parameters.

9. The method of claim 1, wherein presenting through the user interface options for speech detection settings comprises presenting a list of the options for speech detection settings.

10. A method for detecting speech utterances within a telephone call, the method comprising:

initializing a voice server having an internal speech detection module with a plurality of software-based speech detection routines;

initializing a configurable external speech detection component operationally located remotely from the voice server to process a received call, wherein:

the external speech detection component is incorporated in a piece of equipment coupled in a signal path between a telephone network and the voice server, the initializing the configurable external speech detection component is performed based on speech detection parameters established prior to receiving the call, and the speech detection parameters identify speech detection processing to be performed on the telephone call;

when the speech detection parameters indicate processing external to the voice server, activating the external speech detection component and conveying to the external speech detection component an indication of a parameter of the speech detection parameters;

receiving the telephone call through a telephone gateway;

processing the telephone call in the external speech detection component to detect a speech utterance within the telephone call in accordance with the indicated parameter;

providing the results of the processing to the voice server; and in response to the provided results, performing in the voice server at least one programmatic action responsive to the detecting of the speech utterance, the programmatic action comprising recognizing speech within the detected speech utterance, wherein the parameters comprise a threshold value, a preferred detection algorithm, and a characterization of speech utterances to be detected.

11. The method of claim 10, wherein the method further comprises:

activating an internal speech detection module; and processing the telephone call in the internal speech detection module.

12. The method of claim 11, wherein:

activating an internal speech detection module comprises activating the internal speech detection module to perform speech detection using a selected software-based speech detection routine of the plurality of software-based speech detection routines.

13. The method of claim 11, wherein:

the results of speech detection performed in the external speech detection component and the internal speech detection module are used conjunctively.

14. The method of claim 11, wherein:

the previously established speech detection parameters comprise parameters received through a user interface from each of a plurality of customers; and the initializing is performed based on parameters associated with a customer making the call.

15. The method of claim 11, wherein:

initializing the voice server and initializing the configurable external speech detection component are performed in response to receiving the call.

16. A system for detecting speech utterances within a telephone call, the system comprising:

a telephone gateway adapted to be coupled to a telephone network to receive signals representative of telephone calls over the telephone network;

a voice server coupled to the telephone gateway, the voice server comprising computer storage media storing computer executable instructions;

a voice detection unit in a piece of equipment connected to couple a telephone call from the telephone network to the voice server, wherein the computer executable instructions comprise instructions, when executed, for:

recognizing content of speech within a detected speech utterance;

receiving user input indicating a level of speech detection and determining based on the user input a parameter for processing to detect speech utterances;

sending a message to the voice detection unit to configure the voice detection unit in accordance with the indicated parameter and to configure a speech detection setting within the voice detection unit based on the indicated parameter;

receiving a result of voice detection from the voice detection unit; and in response to the received results, performing at least one programmatic action.

17. The system of claim 16, wherein the piece of equipment comprises an interface slot and the voice detection unit is plugged into the interface slot.

18. The system of claim 17, wherein the piece of equipment comprises a router and the voice detection unit is plugged into the interface slot of the router.

19. The system of claim 17, wherein the piece of equipment comprises a telephony switch and the voice detection unit is plugged into the interface slot of the telephony switch.

20. The system of claim 17, wherein the piece of equipment comprises the telephone gateway and the voice detection unit is plugged into the interface slot of the telephone gateway.

* * * * *